Figure 1:
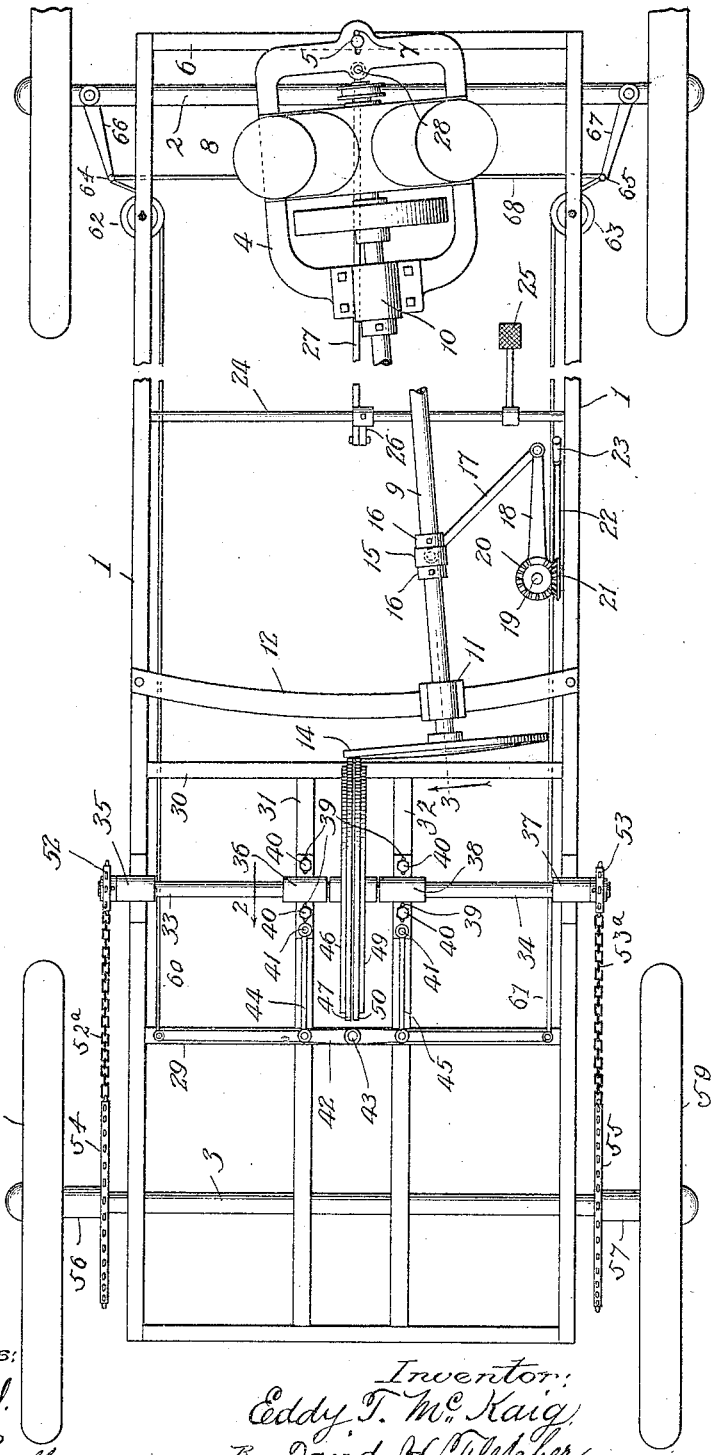

E. T. McKAIG.
FRICTION DRIVE MECHANISM FOR AUTOMOBILES.
APPLICATION FILED NOV. 12, 1917.

1,297,485.

Patented Mar. 18, 1919.
2 SHEETS—SHEET 1.

Witnesses:
Inventor:
Eddy T. McKaig
By David H. Fletcher
Atty.

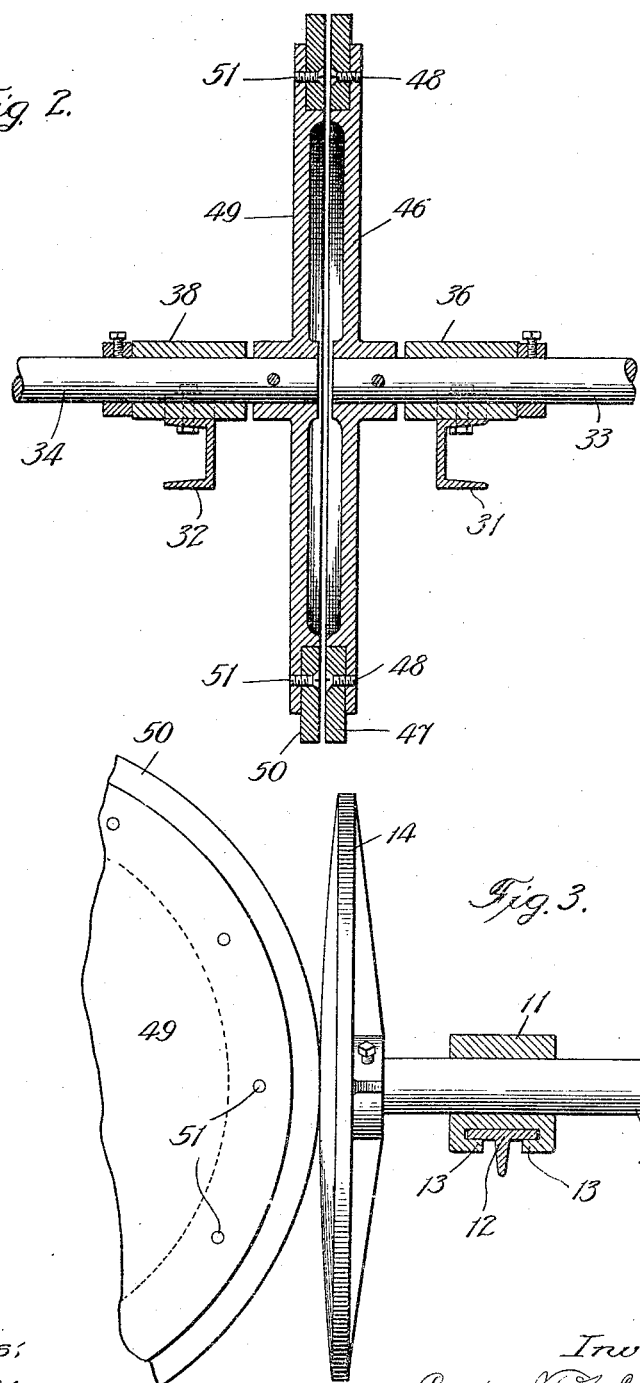

UNITED STATES PATENT OFFICE.

EDDY T. McKAIG, OF WAUKEGAN, ILLINOIS.

FRICTION DRIVE MECHANISM FOR AUTOMOBILES.

1,297,485.                  Specification of Letters Patent.        Patented Mar. 18, 1919.

Application filed November 12, 1917.   Serial No. 201,597.

*To all whom it may concern:*

Be it known that I, EDDY T. McKAIG, residing at Waukegan, in the county of Lake and State of Illinois, have invented certain new and useful Improvements in Friction Drive Mechanism for Automobiles, of which the following is a description, reference being had to the accompanying drawings, forming a part of this specification, in which corresponding numerals of reference in the different figures indicate like parts.

The object of my invention is to provide a simple and effective friction drive mechanism or power transmission device adapted more especially for use upon automobiles, motor-cycles and other vehicles. To this end, my invention consists in the combination of elements hereinafter more particularly described and definitely pointed out in the claims.

In the drawings—

Figure 1 is a plan view showing the running-gear of an automobile embodying the features of my invention.

Fig. 2 is an enlarged sectional view taken upon the line 2—, Fig. 1, viewed in the direction of the arrow there shown, and Fig. 3 is view partly in section, taken upon the line 3—, Fig. 1, viewed in the direction of the arrow there shown.

Referring to the drawings, 1 indicates the main frame of the structure mounted in a well known way upon front and rear axles 2 and 3. An engine frame 4 is pivotally mounted at 5 upon a cross-bar 6; a slot 7, being formed in said frame to provide for an end-wise movement of said engine, together with the driving shaft in the manner and for the purpose hereinafter described.
The engine, generally designated by 8, which may be of any well known type, is provided with a rearwardly extended driving shaft 9, the forward part of which is mounted in suitable bearings in the frame 4, one of which is shown at 10. The opposite end of said shaft is mounted in a bearing 11, Figs. 1 and 3, so as to have both a rotary and longitudinal movement therein. Said bearing is supported upon a curved cross-bar 12, the ends of which are rigidly attached to the frame members 1. Flanges 13, Fig. 3, are formed upon the bearing 11, which flanges are in loose engagement with lateral flanges upon the bar 12, so that said bearing may be firmly held in place while free to slide upon said bar. The curve of the bar 12, corresponds to the arc described by the movement of the bearing 11, when the shaft 9 is moved laterally.

Rigidly mounted upon the end of the shaft 9 is a friction driving gear 14, having a convex or semi-spherical face, the curve of which is concentric with that of the bar 12. A sleeve 15, is loosely mounted upon the shaft 9, being held in place by means of collars 16, at opposite ends, which collars are rigidly attached to said shaft. A link 17 has one end pivotally attached to said sleeve and the other to the free end of an arm 18, which is pivoted at 19, to a bracket, not shown, attached to the frame 1. A gear 20, which is rigid with said arm, is arranged to mesh with the teeth of a corresponding gear 21, pivoted upon a horizontal axis upon the frame. The latter gear is provided with an operative lever 22, having a handle 23. Upon actuating the lever 22, the shaft 9 may be moved laterally to any desired extent for the purpose of varying the speed of the driven gears as hereinafter described.

In order to impart a longitudinal movement to said shaft for the purpose of engaging or disengaging the gears, the following described means is provided. Extending crosswise of the frame and pivoted thereto, is a rock-shaft 24, adapted to be actuated by means of a treadle 25. A depending arm 26, which is rigidly attached to said shaft, has its free end connected by means of a link 27 to the engine frame at 28. A pressure upon the treadle serves to tilt the rock-shaft, thereby moving the engine frame and shaft 9 rearwardly so as to press the friction gear 14 into operative contact with the driven gears.

Rigidly attached to the longitudinal frame members 1, are cross-bars or supporting members 29 and 30, which serve in turn as supports for parallel longitudinal frame members 31, 32. Independent shafts 33, 34, are arranged in axial alinement transversely of the frame, the former being journaled in bearings 35, 36, and the latter in similar bearings 37 and 38. The bearings 35 and 37 are rigidly attached to the frame-members 1, while the bearing 36 is mounted upon the support 31, and the bearing 38 upon the support 32. Each of said last named bearings or journal boxes, is provided with a flat base or extension having slots 39 therein for the reception of bolts 40, 41, so adjusted as to permit a slight longitudinal movement of the journal boxes, while in other respects holding them firmly in position. The movement contemplated by this construction is so slight as to be amply provided for by the normal play of the shafts in the boxes 35 and 37. A compensating lever 42, is pivoted at 43, upon the frame member 29, and is connected upon one side of said pivot with the journal box 36, by means of a link 44, and upon the other with the journal box 38, by means of a link 45. The purpose of this construction will be presently explained. Splined or otherwise rigidly mounted upon the shaft 33, is a wheel or disk 46, having an annular friction member 47, attached thereto by means of screws 48, while a like wheel 49 is mounted in like manner upon the shaft 34 and is provided with a like friction ring or member 50, attached thereto by means of screws 51. The friction rings 47, 50, may be formed from raw-hide, compressed fiber or other suitable material adapted to form a friction surface; said rings being placed upon the inner adjacent faces of the disks so as to be brought as nearly together as may be without contact. It is essential that the working faces of the rings should be as narrow as may be consistent with strength and efficiency. The periphery of each of the friction members is in operative proximity to the convex face of the driving disk 14, the opposing surfaces being brought into contact by means of the treadle 25, by which the shaft 9 may be moved longitudinally as described, to press said disk into operative contact with said friction members so as to rotate them in unison.

The purpose of the equalizing bar 42 and its connecting links, is to provide for any unevenness caused from wear or otherwise of the friction rings upon the driven gears. The pivotal action of said bar will cause each ring to be pressed at all times with equal force against the face of the driving disk, which action will be permitted by the reciprocating movement of the bearing boxes 36, 38, in opposite directions.

The shafts 33 and 34, are provided respectively with sprocket-wheels 52, 53, which may be connected by means of sprocket-chains 52ª, 53ª, with sprocket-wheels 54, 55, rigidly attached to hubs 56, 57 respectively, of the traction wheels 58, 59, which hubs are loosely mounted upon a non-rotative axle 3, so as to enable said wheels to be revolved independently of each other. Upon turning curves, it will be apparent that the outer wheel would be caused to rotate faster than the inner one, so as to cause a difference in the relative frictional action of the parts 47, 50, upon the driving disk 14. In order to overcome this objection, I have provided means for temporarily holding the disk connected with the slow running wheel, out of contact with the driving disk 14. This result is accomplished, preferably, by making the equalizing bar 42, longer than would be necessary were it intended merely to actuate the links 44, 45, and attaching to the ends thereof flexible connections in the form of wire rope or cords 60, 61, which are trained upon pulleys 62, 63, mounted beneath the forward part of the frame 1 and connected so as to afford the proper length of movement, such, for example, as shown at 64, and 65, to the steering gear lever arms 66, 67, to which the usual connecting rod 68, is attached in a well known way.

The operation of the device is as follows: When, for example, a turn is made to the left, the disk 46 should be withheld from contact with the driver 14. This may be accomplished through the action of the steering-gear lever-arm 67, which will be moved toward the right, away from the pulley 63, thereby pulling upon the cord 61 and causing the right-hand end of the equalizing bar to be moved forward. At the same time, the steering-gear arm 66, is moved toward the pulley 62, thereby causing a corresponding slack in the cord 60. It will thus be seen that while the equalizing bar 42, tends normally, or while the vehicle is running upon a substantially straight track, to equalize the pressure of the two surfaces 47, 50, against the driving disk, the action of the steering-gear in either direction will cause the balance to be overcome and instead, will result in pressing the periphery of one of the disks with greater force against the surface of the driver, while that of the other is removed from contact therewith through the reverse action of the compensating bar and the consequent movement of the slidable bearings 36, and 38, in opposite directions. This movement need be but slight and is intended to be only sufficient to insure the slow moving disk against wear. It may be regulated in extent by the relative tension of the cords 60, 61, and the relative points of attachment thereof to the steering-gear members.

The speed of the machine may be varied by operating the lever 22, to shift the relative position of the shaft 9, thereby varying the relative point of contact of the driving and driven gears with respect to the center of the former.

An important advantage of the construction is that it enables a very narrow surface of the driven gear to be brought into contact of the driven gear, thereby eliminating to the utmost extent, the well known grinding action peculiar to this method of transmission, and which, if the driven gear has a wide surface, is liable to absorb an undue percentage of the power intended to be transmitted.

Having thus described my invention I claim:

1. A frictional power transmission in which is combined a driving shaft, a friction gear mounted thereon, independent driven shafts arranged in axial alinement, friction gears in close proximity to each other upon the meeting ends of said shafts, and means for bringing the gears upon said driving and driven shafts into operative contact with each other to permit said friction-gear to engage both of said driven gears at adjacent contact-points upon the same side of its axis to drive them in a corresponding direction.

2. A frictional power transmission in which is combined a driving shaft, a friction gear mounted thereon, independent driven shafts arranged in axial alinement, friction gears in close proximity to each other upon the meeting ends of said shafts, means for bringing the gear upon said driving shaft into operative contact with those upon said driven shafts, and means for equalizing the pressure of the driven gears against the driving gear.

3. A frictional gear transmission mechanism in which is combined a driving shaft, a driving friction gear mounted thereon, means for moving said shaft laterally, independent driven shafts arranged in axial alinement, friction driven gears mounted upon the meeting ends of said shafts, means for bring said driving and driven gears into operative contact with each other at adjacent points upon the same side of the driving-shaft and means for balancing the effective pressure of said driven gears against the face of said driving gear.

4. A friction gear transmission mechanism in which is combined a driving shaft, a driving friction gear mounted thereon, independent driven shafts arranged in axial alinement, driven friction gears mounted upon the meeting ends of said shafts in close proximity to each other to be driven in unison, means for bringing said driving and driven gears into operative contact with each other, means for permitting the meeting ends of said shafts to be moved laterally and connecting means for causing said shafts to be simultaneously moved in opposite directions to cause said driven gears to be pressed with equal force against said driving gear.

5. A friction gear transmission mechanism in which is combined a driving shaft, a driving friction gear mounted thereon, independent driven shafts arranged in axial alinement, driven friction gears mounted upon the meeting ends of said shafts in close proximity to each other, means for bringing said driving and driven gears into operative contact with each other, means for permitting the meeting ends of said shafts to be moved laterally in a common plane, a compensating bar pivoted at its middle to a stationary point and means for connecting the ends of said bar to said shafts respectively whereby the pressure of said driven gears against said driving gear may be equalized.

6. A friction-gear transmission mechanism in which is combined a driving shaft, a driving friction gear mounted thereon, means for imparting a longitudinal movement to said shaft, independent driven shafts arranged in axial alinement, friction gears mounted upon the meeting ends of said shafts in immediate proximity to each other to bear at adjacent points against said driving friction gear to cause them to be driven thereby in unison in the same direction, means for bringing said driving and driven gears into operative contact with each other, and means in operative connection with said driven shafts for equalizing the pressure thereof when in such contact.

7. A friction gear transmission mechanism for vehicles in which is combined a driving shaft, a driving friction gear mounted thereon, independent driven shafts arranged in axial alinement, friction gears mounted upon the meeting ends of said shafts with their peripheries in operative proximity to the face of said driving gear, and pivoted means for moving the meeting ends of said shafts in opposite directions to cause a balanced pressure of said driven friction gears against the face of said driving gear.

8. A friction gear transmission mechanism for vehicles in which is combined a driving shaft, a driving friction gear mounted thereon, independent driven shafts arranged in axial alinement, friction gears mounted upon the meeting ends of said shafts with their peripheries in operative proximity to the face of said driving gear, means for moving said driving and driven gears into and out of contact, means for moving the meeting ends of said alined shafts in opposite directions and means for actuating said moving means.

9. A friction gear transmission mechanism for vehicles, in which is combined a driving shaft, a driving friction gear mounted thereon, independent driven shafts arranged in axial alinement, means for operatively connecting each of said shafts to a traction wheel, friction gears mounted upon the meeting ends of said driven shafts with their peripheries in operative proximity to the face of said driving gear, means for moving the meeting ends of said alined shafts in opposite directions and means for actuating said shaft moving means.

In testimony whereof I have signed this specification, in the presence of two subscribing witnesses, this ninth day of November, 1917.

EDDY T. McKAIG.

Witnesses:
DAVID H. FLETCHER,
HARRY I. CROMER.

Copies of this patent may be obtained for five cents each, by addressing the "Commissioner of Patents, Washington, D. C."